(12) United States Patent
Morrone, III (10) Patent No.: US 9,038,313 B2
(45) Date of Patent: May 26, 2015

(54) SAFETY GUARD OR GATE (71) Applicant: Safe @ Home, LLC, Wakefield, RI (US)

(72) Inventor: Joseph A. Morrone, III, Wakefield, RI (US)

(73) Assignee: Safe @ Home, LLC, Wakefield, RI (US)

( * ) Notice: Subject to any disclaimer, the term of this patent is extended or adjusted under 35 U.S.C. 154(b) by 0 days.

(21) Appl. No.: 14/528,767

(22) Filed: Oct. 30, 2014

(65) Prior Publication Data

US 2015/0047265 A1 Feb. 19, 2015

Related U.S. Application Data (63) Continuation of application No. 13/267,912, filed on Oct. 7, 2011, now Pat. No. 8,898,957.

(51) Int. Cl.
| | |
|---|---|
| *E06B 3/68* | (2006.01) |
| *E06B 7/00* | (2006.01) |
| *E06B 9/01* | (2006.01) |
| *E05C 19/00* | (2006.01) |
| *E06B 9/00* | (2006.01) |
| *E06B 11/04* | (2006.01) |

(52) U.S. Cl.
CPC ............... *E05C 19/003* (2013.01); *E06B 9/00* (2013.01); *E06B 11/04* (2013.01); *E06B 2009/002* (2013.01)

(58) Field of Classification Search
CPC ............... E06B 9/01; E06B 9/02; E06B 9/04; E06B 9/06; E06B 9/0607; E06B 9/063; E06B 2009/002; E06B 2009/06
USPC .................... 49/50, 55, 57, 61, 464
See application file for complete search history.

(56) References Cited

U.S. PATENT DOCUMENTS

| | | |
|---|---|---|
| 3,163,205 A | 12/1964 | Gottlieb |
| 4,149,342 A | 4/1979 | Bowers |
| 4,671,012 A | 6/1987 | Merklinger et al. |
| 4,685,316 A | 8/1987 | Hicks et al. |

(Continued)

OTHER PUBLICATIONS

US Consumer Product Safety Commission, CPSC Urges Parents and Caregivers to Consider Safety Before Opening Windows, Jul. 6, 2010. Retrieved on Sep. 2, 2011. Retrieved from the Internet <URL:http://cpsc.gov/cpscpub/prerel/prhtml10/10294.html>.

(Continued)

*Primary Examiner* — Katherine Mitchell
*Assistant Examiner* — Shiref Mekhaeil
(74) *Attorney, Agent, or Firm* — Antoinette G. Giugliano; AGG Intellectual Property Law (57) ABSTRACT

A safety guard or gate for placement in a frame of an opening to prevent a child or pet from passing though the opening. The present invention includes an adjustable means for adjusting the guard to fit the width of the frame, wherein the adjustable means has a first end and a second end to form an axis along which the means can be adjusted. The invention further includes an attachment means for securing the guard to the frame; and a securing means for securing the adjustable means to the attachment means. The securing means prevents the adjustable means from disengaging from the attachment means along the axis when in a locked position, and allows disengagement and reengagement of the adjustable means in direction that transects the axis when the securing means is in an unlocked position. The present invention further includes methods for using the safety guard, and systems that include elements of the safety guard.

6 Claims, 11 Drawing Sheets

(56) References Cited

U.S. PATENT DOCUMENTS

| | | |
|---|---|---|
| 4,817,334 A | 4/1989 | Badger et al. |
| 5,018,302 A | 5/1991 | Kluge |
| 5,339,567 A | 8/1994 | Pierpont |
| 5,475,945 A | 12/1995 | Baker |
| 5,570,543 A | 11/1996 | Bishop |
| 5,575,113 A | 11/1996 | Huang |
| 5,704,164 A | 1/1998 | Huang |
| 6,141,912 A | 11/2000 | Graham et al. |
| 6,247,882 B1 | 6/2001 | Huang |
| 6,474,021 B2 | 11/2002 | Homeyer |
| 6,578,664 B1 | 6/2003 | Doherty |
| 8,297,011 B2 | 10/2012 | Quick |
| 8,297,336 B2 | 10/2012 | Yates |
| 2009/0158665 A1 | 6/2009 | Wu |
| 2011/0232029 A1 | 9/2011 | Hartgens |
| 2012/0144745 A1 | 6/2012 | Yates |

OTHER PUBLICATIONS

Guardian Angel Window Guards. Retrieved on Jun. 30, 2011. Retrieved from the Internet URL: http://www.angelguards.com/specs.htm.

SAFETY GUARD OR GATE

RELATED APPLICATION

This application is a continuation of U.S. application Ser. No. 13/267,912, filed Oct. 7, 2011.

The entire teachings of the above application are incorporated herein by reference.

BACKGROUND OF THE INVENTION

Open windows pose a risk of serious injury or death to children and pets. It is particularly problematic during warm summer months when people are likely to open windows in an attempt to cool their homes. In fact, the U.S. Consumer Product Safety Commission (CPSC), in 2010, estimated that about eight deaths occur annually to children age 5 or younger while an estimated 3,300 children in the same age group are treated each year in U.S. hospital emergency departments. Hospitalization was required for about 34 percent of these children.

Accordingly, CPSC recommends the use of window guards. Certain models of window guards can be cumbersome and time consuming to install. Additionally, window guards should comply with certain guidelines. Among several requirements, state and/or federal regulations often require that window guards have a releasable feature which allows the guard to be released and removed from the inside without the use of a release key, separate tools, or excessive force, so as to permit escape in the event of an emergency.

Accordingly, a need exists for a safety guard or gate for placement in a frame of an opening to prevent a child or pet from passing though the opening. A further need exists for such a safety guard or gate to be easily locked and unlocked into place in the event of an emergency and to function properly even if it has been damaged due to use. Yet, another need exists for such a safety guard or gate to be collapsible to allow for easy storage and placement on a retail shelf.

SUMMARY OF THE INVENTION

The present invention relates to a safety guard or gate which can be installed into a frame of an opening, such as a window, doorway or stairwell so as to prevent children and pets from falling through the opening. The safety guard of the present invention includes a telescopic means for adjusting the guard to fit the width of the frame, wherein the telescopic means has a first end and a second end. The safety guard of the present invention also has a first bracket having a first bracket base and a first bracket clip, wherein the first bracket base having a means for securing the first bracket base to the frame, wherein the first bracket base is adapted to receive the first end of the telescopic means, and the first bracket clip locks the first end of the telescopic means into place. The safety guard also includes a second bracket having a second bracket base and a second bracket clip, wherein the second bracket base having a means for securing the second bracket base to the frame, wherein the second bracket base is adapted to receive the second end of the telescopic means, and the second bracket clip locks the second end of the telescopic means into place. In an aspect, the telescopic means can be adjusted to fit the width of a frame e.g., in the range of about 14 to about 120 inches wide. In particular, the safety guard can fit standard size windows, wherein the height or width of the window frame ranges in an amount between about 14 and about 17 inches, about 17 and about 23 inches, about 23 and about 35 inches, about 35 and about 58 inches, about 58 and about 90 inches, and about 90 and about 120 inches. Accordingly, the safety guard of the present invention, in an embodiment, can be adjusted by an amount ranging between about 1 inch and about 50 inches. When using the standard window frame height/widths described above, the guard adjusts about 3 inches (for a window frame size of between about 14 and 17 inches), about 6 inches (for a window frame size of between about 17 and 23 inches), about 12 inches (for a window frame size of between about 23 and 35 inches), about 23 inches (for a window frame size of between about 35 and 58 inches), about 30 inches for a window frame size of between about 90 and 120 inches), or about 32 inches (for a window frame size of between about 58 and 90 inches).

The safety guard can be made from a number of different types of materials including steel, aluminum, cast iron, plastic or any combination thereof and can be used to construct the entire safety guard or portions of it. Other materials providing sufficient strength and rigidity can also be used to make the safety guard or parts of the safety guard, as described herein. Parts of safety guard can be made from the same type of material or different types of materials.

In yet another embodiment, the safety guard of the present invention includes a locking mechanism locking the safety gate into a locked position. The locking mechanism, in an embodiment, has a bracket clip having a first end and a second end wherein the first end and the second end that attaches to adjustment means to be locked into position. The bracket clip has a first arm and a second arm, and the arms are pivotally connected and have a tab. When positioned into the locked position, the tabs on each arm extend and the first end and second end are pushed farther apart as compared to their position in the unlocked position. A bracket base can be adapted to receive the extended tabs and the end of the adjustment means while in the locked position. In an aspect, the locking mechanism can comprise e.g., a bracket clip, a bolt and slot arrangement, a fastener, a trap-lock, a hook, a clip or any combination thereof.

The present invention pertains to guard or gate having an adjustable means, an attachment means and a securing means. The adjustable means adjusts the guard to fit the width of the frame, and has a first end and a second end to form an axis along which the means can be adjusted. The adjustable means can include one or more telescopic arrangements, crossbars, or rods. The attachment means (e.g., a base) secures the guard to the frame, and the securing means secures the adjustable means to the attachment means. In particular, the securing means prevents the adjustable means from disengaging from the attachment means along the axis when in a locked position. The securing means also allows disengagement and reengagement of the adjustable means in direction that transects the axis when the securing means is in an unlocked position. In an aspect, the securing means prevents the adjusting means from being adjusted when in a locked position.

In another embodiment, the window guard of the present invention includes a pair of telescopic means for adjusting the guard to fit the width of the window, wherein each telescopic means has a first end and a second end. The guard of the present invention further includes a first bracket having a first bracket base and a first bracket clip, wherein the first bracket base has a first means for securing to the first bracket base to the window frame, wherein the first bracket base is adapted to receive the first end of each of the telescopic means, and the first bracket clip locks the first end of each of the telescopic means into place. The guard also includes a second bracket having a second bracket base and a second bracket clip, wherein the second bracket base having a second means for securing the second bracket base to the window frame, wherein the second bracket base is adapted to receive the second end of each of the telescopic means, and the second bracket clip locks the second end of each of the telescopic means into place.

In yet another aspect, the present invention relates to a locking mechanism locking a device into a locked position. The locking mechanism includes a bracket clip having a first end and a second end wherein the first end and the second end attaches to a portion of the device to be locked into position, the bracket clip has a first arm and a second arm wherein the first and second arms are pivotally connected, the first arm and the second arm each have a tab, wherein when positioned into the locked position, the tabs on each arm extend and the first end and second end are pushed farther apart as compared to their position in the unlocked position. The locking mechanism also has a bracket base adapted to receive the extended tabs and a portion of the device while in the locked position. In an aspect, the locking mechanism is adapted to be utilized manually between a locked position and an unlocked position, and wherein in the locked position, the tabs on each arm extend and the first end and second end are pushed farther apart as compared to their position in the unlocked position;

The present invention also pertains to methods for securing the safety guard of the present invention to a frame of an opening described herein. The methods include the steps of adjusting the telescopic means to fit the width of the frame; locking the telescopic means; and engaging the first and second brackets to secure the telescopic means to the frame. The methods also include securing the first bracket base and second bracket base to the frame, and engaging the first bracket clip and the second bracket clip. The methods further include disengaging the first bracket clip and the second bracket clip to unlock the telescopic means; disengaging the first and second brackets to release the telescopic means from the frame; removing the safety guard from the frame; and collapsing the safety guard so that it can stored.

In an aspect, the methods for removing the removing the safety guard or gate described herein include the steps of disengaging the first and second brackets; and removing the ends of the telescopic means out of the bracket bases. The method can further include unlocking the telescopic means; and adjusting the telescopic means to a minimum width.

The methods of the present invention include removing the safety guard from a frame after the guard has been damaged. The method includes the steps of disengaging the first and second brackets; and removing the ends of telescopic means from the bases. In this embodiment, the means for locking the telescopic means does not need to be engaged.

The present invention includes systems or kits that have elements of the safety guard, as described herein, tools for installing the safety guard (e.g., hex tool, a wrench, a screw driver, and the like), window stoppers or any combination thereof. Stoppers can be used on each side of the frame to prevent the window from opening past a certain point.

The present invention has several advantages. The safety guard of the present invention allows for easy locking and unlocking so that a user can easily unlock and remove the device from the window in the event of an emergency. The safety guard is designed to remain sturdy and stable in the event that it is hit, crimped, or damaged during in-house use or testing. It also features unique groves allowing for quick installation into and removal from the window. The safety guard is collapsible, allowing for easy storage in the house as well as placement on a retail shelf. The safety guard also embodies a telescopic means for adjusting the height or alternatively the width of the safety guard or gate in order to fit openings of varying dimensions. Furthermore, the safety guard of the present invention, in certain aspects, is designed to include less than a 4-inch maximum gap or space between the telescopic tubes, complying with the American Society for Testing and Materials (ASTM) standard for fall prevention devices. When the safety guard system is being used in a window with an opening which exceeds the dimensions at which a maximum gap of 4 inches can be maintained, window stoppers can be used to prevent the window from being opened too far, thereby ensuring compliance with this standard.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention relates to a safety guard or gate for placement in a frame of an opening to prevent a child or pet from passing though the opening. The safety guard or gate of the present invention can be easily installed into a frame of an opening such as a window (e.g., windows that opens horizontally or vertically), doorway or stairway of varying heights and widths. Once the safety guard or gate of the present invention is installed in a frame of an opening, the unique locking mechanism ensures that the safety guard or gate will not accidentally come loose due to forces. Additionally, the unique locking mechanism of the safety guard or gate allows for both quick and convenient installation and removal in the event of an emergency, even if the safety guard or gate has been dented, crimped or damaged due to testing or in-house use.

The safety guard can be fully collapsed for easy storage both within the user's home and on a retail shelf. The dimensions of the fully collapsed safety guard also makes for convenient shipping. Furthermore, in an embodiment, the maximum spacing between certain structural members of the safety guard generally is less than 4 inches or an amount that meets local code requirements, thereby preventing children and pets from being able to climb through the safety guard of the present invention.

Figure 1:
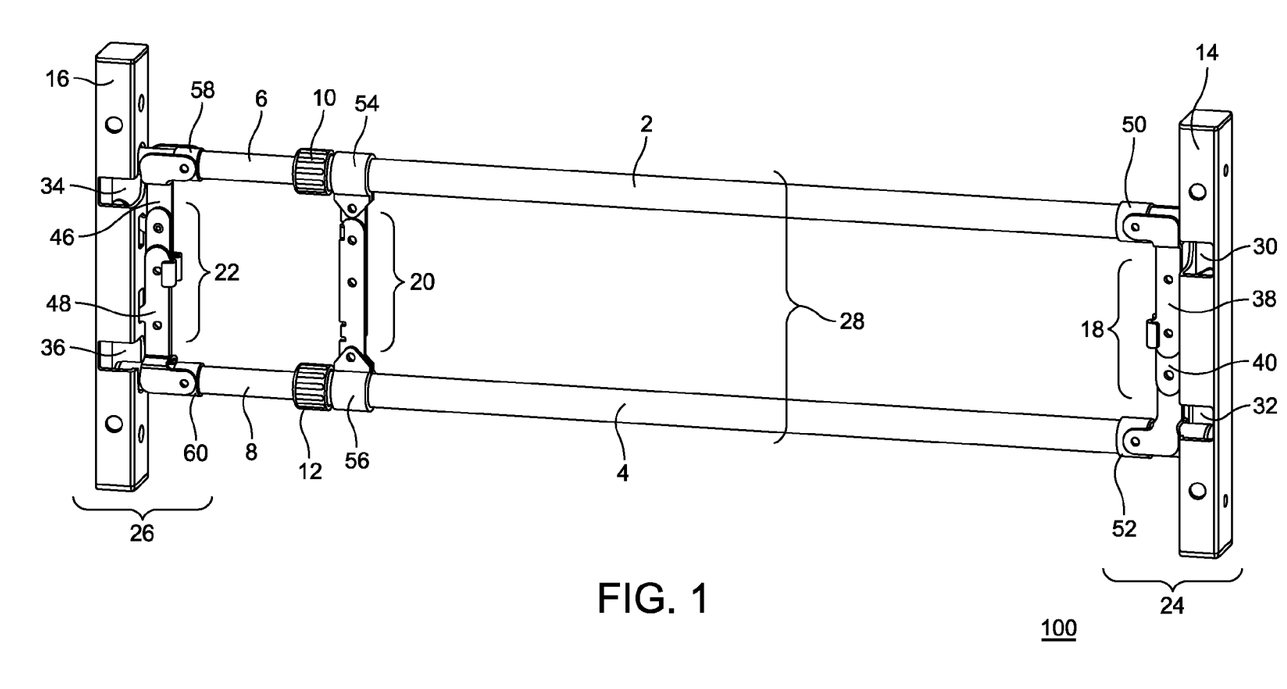
FIG. 1 is a schematic of a perspective view of the window guard of the present invention.

With respect to FIG. 1, safety guard 100 is shown in a locked position. Generally, the safety guard of the present invention includes adjustable telescopic means, and a locking mechanism at each end. The adjustable telescopic means 28 allows the safety guard 100 to adjust to fit the frame of the opening. Telescopic means is an example of adjustment means that can be used in the present invention. In an embodiment, the adjustment means can be adjusted in a range from about 1 inch to about 50 inches. In an aspect, the adjustment means can be adjusted to fit the width of a frame e.g., in the range of about 14 to about 120 inches wide. When using the standard window frame height/widths, further described herein, the guard adjusts about 3 inches (for a window frame size of between about 14 and 17 inches), about 6 inches (for a window frame size of between about 17 and 23 inches), about 12 inches (for a window frame size of between about 23 and 35 inches), about 23 inches (for a window frame size of between about 35 and 58 inches), about 30 inches for a window frame size of between about 90 and 120 inches), or about 32 inches (for a window frame size of between about 58 and 90 inches). The telescopic means includes inner and outer telescopic tubes and a locking cap. In the case of telescopic means, in an embodiment, the present invention includes at least two or more telescopic means (e.g., 3, 4, 5, 6, 7, 8, 9, or 10).

More specifically, the inner tubes slide within the outer tubes and can be locked into place with a locking cap. First locking cap 10 can be loosened to allow for the telescopic motion of the first telescopic inner tube 6 within the first telescopic outer tube 2. Similarly, second locking cap 12 can be loosened to allow for the telescopic motion of the second telescopic inner tube 8 within the second telescopic outer tube 4. In the embodiment shown in the figure, locking caps 10 and 12 are circular with a gripping structure and are disposed on the telescopic inner tubes. In this embodiment, the locking caps have threads that screw onto the telescopic outer tubes. The locking means can utilize any gripping structure known in the art or developed in the future so long as the locking means locks the telescopic tubes (e.g., adjustable means) once adjusted and unlocks to readjust. In addition to locking caps, examples of gripping structures include friction locks or push button locks. In the case of push button locks, holes can be pre-machined into the tubing at a plurality of positions to allow for adjustment to different widths. The locking caps can be made from rubber, plastic, metal, composite material or any combination thereof through processes such as molding, injection molding and metallurgical machining Such materials can be obtained, e.g., from Atlantic Rubber Company, Inc. (Littleton, Mass.). Similarly, plastic injection molding locking caps and composite locking caps are commercially available from Bridgewater Associates (Middleboro, Mass.) and Da/Pro Northeast (Newburyport, Mass.). In an alternative embodiment, friction locks or push button locks, which are both commonly used to hold tent poles in place, could be used in place of locking caps.

The telescopic motion of the inner tubes 6 and 8 within the outer tubes 2 and 4 allow for the adjustability of safety guard 100 for placement in a frame of an opening. The telescopic means can be any adjustable means that allows the guard to be adjusted to fit the frame. For example, in place of inner and outer tubes, the guard can use one or more cross bars that can be adjusted and held into place with clamps, locking pins and the like. In another embodiment, a hemmed edge rod system similar to the type commonly used to hold window curtains can be used in connection with a spring-loaded release adjustment button as a means for holding the adjustable rod system locked at a given width. Any adjustable means can be used so long as the guard can be adjusted horizontally to fit the frame and provides the necessary support. Once safety guard 100 is adjusted to the width for the opening in which it is being installed, the locking means, locking caps 10 and 12, can be tightened to prevent any further telescopic motion or adjustment of the inner tubes within the outer tubes. The adjustable means or telescopic inner and outer tubes can be made from stainless steel, aluminum, plastic, composite material, other metallic material or any combination thereof. The material can be any material known or later developed so long as it is suitable for adjustment within a frame and to withstand force applied against it. The telescopic inner and outer tubes can be fabricated by rolling sheet metal, then welding together the two edges of the rolled surface. Alternatively, an annealing process can be used to fabricate the inner and outer telescopic tubes. Other metallurgical processes can also be used to fabricate the inner and outer telescopic tubes. Fabricators capable of producing the inner and outer telescopic tubes used in the present invention are available commercially and can be obtained, e.g., from Haverhill Steel (Haverhill, Mass.), Cromwell Steel (Plainwell, Mass.), Atlantic Stainless Co., Inc. (North Attleboro, Mass.), and AAA Metals Co, Inc, (Hanson, Mass.).

The shape of the telescopic tubs can be of any shape including, cylindrical (as shown herein), oblong, elliptical, rectangular, and the like. The inner and outer telescopic tubes complement one another so that the inner tube can slide within the outer tube. In an embodiment, the inner tube can be hollow or solid.

Figure 2:
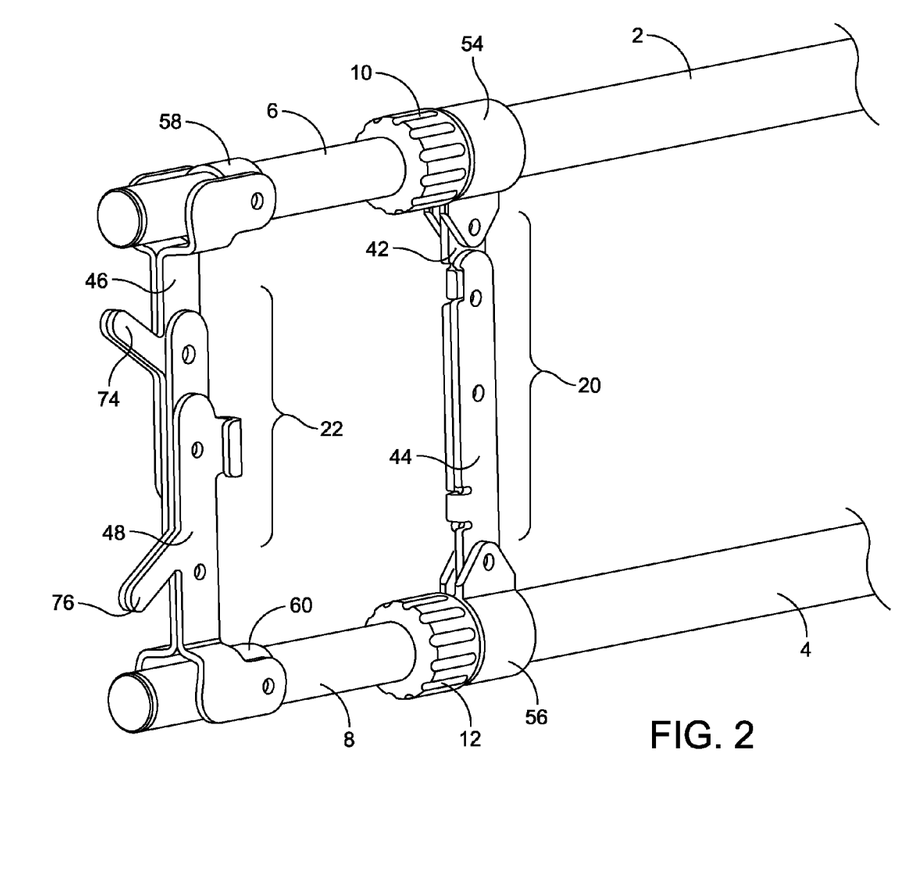
FIG. 2 is a perspective, detailed view of the locking mechanism including an end bracket clip, a mid-section bracket clip, telescopic outer and inner tubes, and locking caps. The locking mechanism is in the locked position.

Referring to FIGS. 1 and 2, once locking caps 10 and 12 have been tightened following adjustment of the inner telescopic tubes within the outer telescopic tubes, first bracket assembly 24 and second bracket assembly 26 can be installed in opposite sides of the frame of an opening. The bracket assemblies 24 and 26 of the present invention function as a locking mechanism and generally includes a bracket base and bracket clips. The first bracket base 14 and second bracket base 16 are secured to the frame and oriented to receive the ends of the telescopic tubes (e.g., oriented in the same direction as the sides of the window frame). The bracket base is an attachment means that allows the safety guard of the present invention to be attached to the frame in which it is installed. The attachment means can be in the form of a base, as shown in the figures. The bases can be attached to the frame with screws, nails, and any other suitable fastener.

First bracket clip 18, mid-section bracket clip 20 and second bracket clip 22 can be partially extended so that the ends of the telescopic tubes can fit into first and second openings in the first bracket base, 30 and 32 respectively, as well as the first and second openings in the second bracket base, 34 and 36 respectively. See FIG. 3. This is an example of the locking mechanism being in an unlocked position. Once the ends of the telescopic tubes are positioned within the four openings in the bracket bases, two in the first bracket base 24 and two in the second bracket base 26, the first, mid-section and second bracket clips 18, 20 and 22, can be expanded to the fully locked position, allowing upper tabs and lower tabs in each of the first and second bracket clips to rotate into the slots 62, 64, 66, and 68, in the first and second bracket bases. FIG. 2 provides an example of the locked position. Upper tab 74 and lower tab 76 are shown in FIGS. 2, 3, 5, 6, 7, and 9 and rotate into slots 66 and 68, respectively. The bracket assembly can include any interlocking locking mechanism that allows the bracket arms to lock into the bracket base, and also allows the telescopic tubes (e.g., adjusting means) to slide out in the event of damage to the telescopic tubes. The tab and slot arrangement, also called a tongue and slot arrangement, generally prevents the safety guard or gate from being pulled away from the bracket bases. The tabs are machined similar to that of the first and second bracket clips and thus can be fabricated using similar methods as the methods described below for bracket clip fabrication.

Once safety guard 100 has been installed in a frame of an opening the first time, the telescopic means 28 for adjusting the width will not need to be adjusted further so long as the safety guard continues to be used in the same frame of an opening, or in an opening of similar width. Future installation and removal of the safety guard can be performed simply by expanding and collapsing the first, mid-section and second bracket clips (18, 20 and 22 respectively), while keeping the first locking cap 10 and second locking cap 12, securely in the locked position.

Bracket clips 18, 20 and 22 each have bracket arms that are pivotally attached to one another to allow a user to move the bracket clips from a close or locked position to an open or unlocked position, as further described herein. In particular, bracket clip 18 includes arms 38 and 40, bracket clip 20 has arms 42 and 44, and bracket clip 22 includes arms 46 and 48. The bracket clips of the present invention further include tabs, as further described herein.

The bracket clips 18, 20 and 22 are attached to the telescopic means 28 using annular attachments 50, 52, 54 56, and 58, and 60. The opening defined by ring of annular attachment/base receives the telescopic tube, and the bracket arm pivotally attaches to the annual attachment. Pivotal attachment of the arms to the annular base, and to one another, allows for the locking (e.g., closed position) and unlocking (partially open position) of the brackets. Any attachment type can be used to attach the brackets to the adjustment means. In addition to an annular attachment, the bracket arms can be attached to the adjustable means using fasteners known in the art or later developed. In an embodiment, such attachment allows for the bracket arms to pivot.

In an embodiment, the bracket bases and bracket clips of the present invention can be made from aluminum, steel, plastic, composite material, cast iron, other metal, plastic, rubber or any combination thereof. The material can be any material known or later developed so long as it is suitable for placement within a frame of an opening, such as a window. Aluminum and/or fabrication sheet metal can be rolled, drilled, cut and welded to form the desired aspects of the bracket bases and bracket clips shown in the drawings. Metallurgical techniques to fabricate the bracket bases and bracket clips of the present invention can be obtained, e.g., from Industrial Metal Products Co. Inc. (Sharon, Mass.). Material described herein, such as aluminum, can be used to construct the entire bracket and bracket clips of the present invention or portions of it.

FIG. 2 shows mid-section bracket clip 20 and second bracket clip 22 in the locked position. The first and second tabs 74 and 76 on the second bracket clip extend outward in an angled manner so that when they are installed in the slots in second bracket base 16, safety guard 100 is locked into place and motion in the telescopic direction is generally prevented, even if locking caps 10 and 12 are loose.

Figure 3:
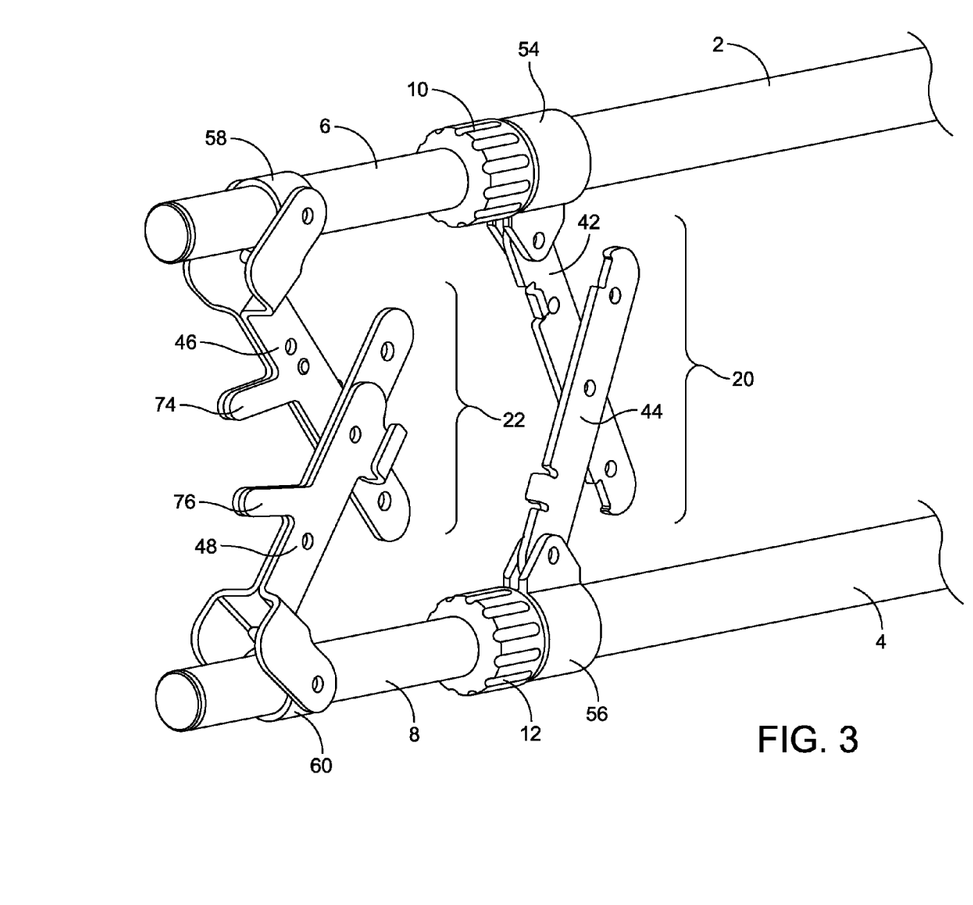
FIG. 3 is another perspective, detailed view of the locking mechanism including an end bracket clip, a mid-section bracket clip, telescopic outer and inner tubes, and locking caps. The locking mechanism is in the unlocked position.

FIG. 3 shows mid-section bracket clip 20 and second bracket clip 22 in a partially collapsed or partially open position. This position is also referred to herein as an "unlocked position." Safety guard 100 can be put into this partially collapsed/partially open position during installation and removal of the present invention. The design of the safety guard allows the guard to withstand every day forces when installed, yet be installed and removed easily. In particular, the safety guard or gate is designed so that it cannot be pulled away from the windows unless the bracket clips are in the open position, thereby allowing the ends of the telescopic tubes to move inward toward each other, free of the notch in the bracket base (See FIG. 4 and further described below).

Figure 4:
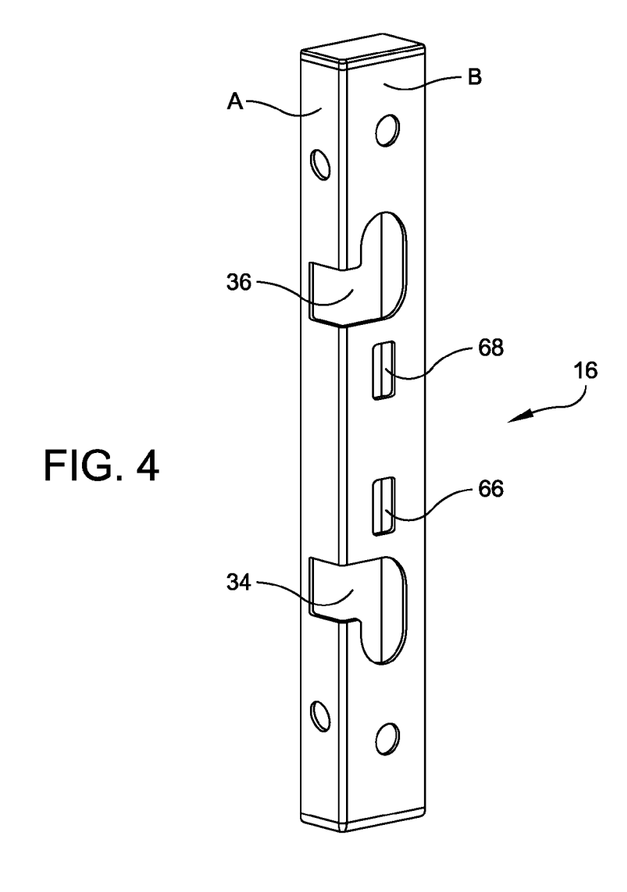
FIG. 4 is a perspective view of the bracket base showing the first and second openings.

Openings 30, 32, 34, and 36 are a curved opening forming a "J" shape, and the "notch" refers to the curved potion of these openings. This is a desirable feature because force that is exerted on the safety guard toward or away from a direction that transects a plane created by the frame opening does not cause the safety guard to become disengaged. The safety guard of the present invention is generally designed to withstand such everyday forces.

In addition, when installing or removing the safety guard, one exerts forces in a different direction than the everyday forces described above. For example, to partially collapse the first, mid-section and second bracket clips, one moves the bracket clips in a direction that is parallel to an axis formed by two points of the window sill (e.g., bottom frame member), which is often not the direction in which accidental forces generally occur. The design of the safety guard allows it to come out of the frame of an opening when someone intends to remove it. Once the ends of the bracket clips are partially collapsed, the telescopic tubes clear the notch in the openings (e.g., openings 30, 32, 34 and 36) in the bracket bases and the safety guard can be pulled away from the frame, free of the first and second bracket bases (14 and 16 respectively). Once the safety guard or gate has been detached from the bracket bases, the safety guard can be collapsed for storage.

In an embodiment, the structural members or arms of the bracket clips can include additional openings positioned along the bracket clips so they line up with each other when the safety guard is installed. In an aspect, a pin, nail, dowel, screw, bolt or lock can be placed through the lined up holes or slots preventing the bracket clips from being collapsed and thereby preventing the safety guard from being removed without first removing the fastening device placed within the holes. In the event that the part can come loose, it is preferably that the part meets safety requirements for choking hazards.

FIG. 4 shows a detailed view of the bracket base including first and second openings 34 and 36, and slots 66 and 68. The first and second openings in each bracket base are disposed on the bracket base and are a squared shape along the front edge, Face A, of the bracket base when viewed by someone facing the frame or opening. The opening forms a "J" shape defining a notch at the curved portion of the opening. Each end of the telescopic means 28 is inserted into each corresponding opening of the bracket bases (e.g., the first and second ends of the telescopic means are inserted into the first and second openings of the bracket base respectively (not shown) on face A). Once the ends of the telescopic tubes are placed within the bracket bases, the telescopic tubes slide along the opening, past the notch of the opening so that the telescopic tubes extrude from Face B. The notch of the opening acts as a barrier that prevents the ends of the telescopic tubes from being pulled away from the bracket base. In addition to using a notch, a means for preventing the telescopic tubes from being pulled away from the bracket base during use include hooks, clips, and/or keepers. In an embodiment, an advantage of using a notched opening is that it allows easy removal of the safety guard from the bracket base without having to remove any clips, hooks, keepers. In addition, in the event of downward or upward forces on the safety guard, the bracket clips hold the telescopic tubes in place because the bracket clips can collapse by applying a force in a different direction (e.g., as a force that is parallel to an axis formed by the window sill). The first, mid-section and second bracket clips can be fully expanded, moving the ends of the telescopic means 28 to the portion of the opening on face B. FIG. 4 also shows slots 66 and 68 into which tabs 74 and 76 of bracket clip 22 rotate when the bracket clip is fully expanded. A bracket base can be secured to a frame with any means known in the art including fastening means such as screws, anchors, nails, bolts, and the like.

Figure 5:
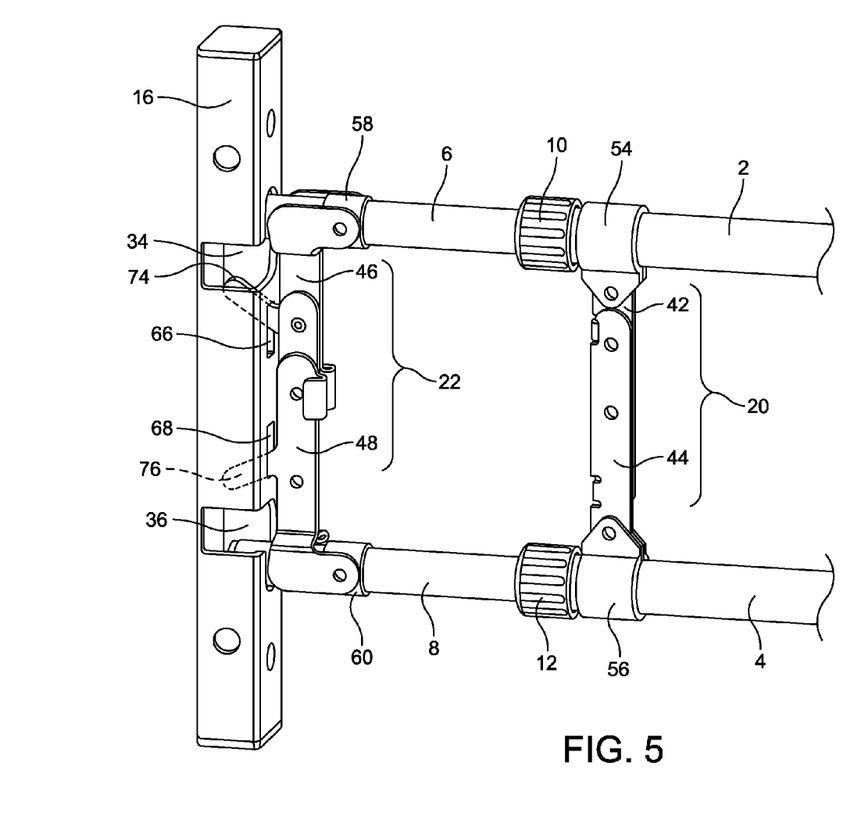
FIG. 5 is a perspective view of the bracket clip assembly with tabs inserted into the bracket base in a locked position.
Figure 6:
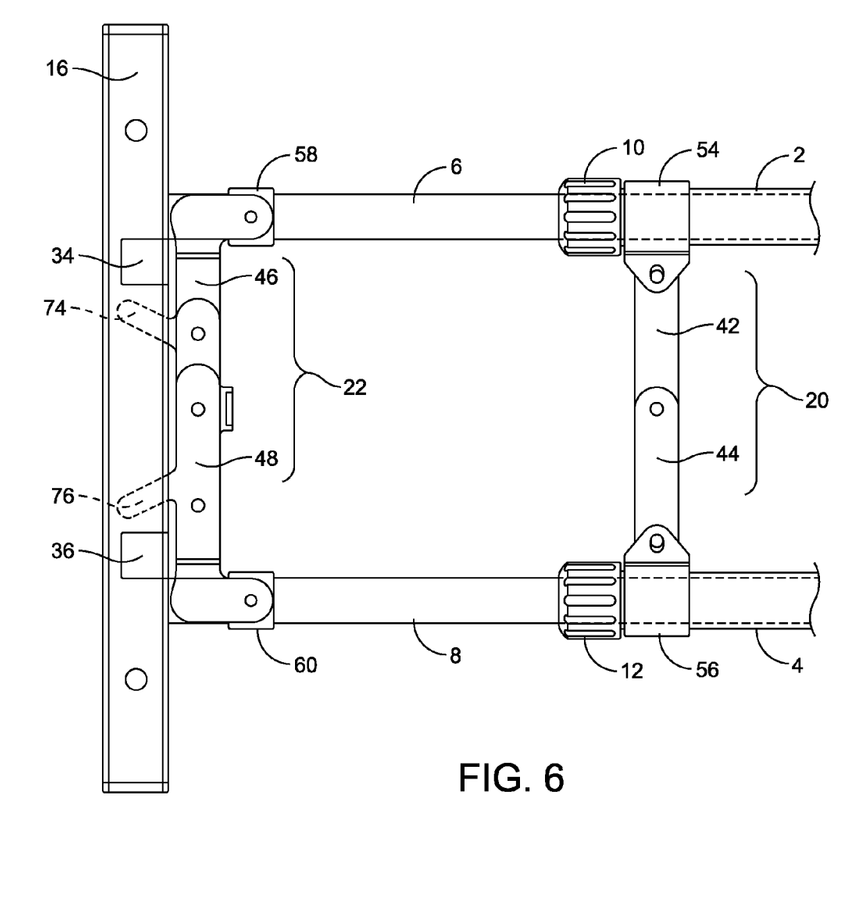
FIG. 6 is a side view of the bracket clip assembly inserted into the bracket base in a locked position.

FIG. 5 and FIG. 6 show perspective and side views of tabs 74 and 76 in second bracket clip 22 inserted into corresponding slots 66 and 68 when the safety guard is in the fully expanded and locked position. The tabs act as a securing means or reinforcement means to further secure the guard to the bracket base. The tabs are angled to rotate into the slots, but can be any shape or size to further secure the guard to the bracket base. For example, the tabs can be curved or have an irregular shape so long as the tabs further secure to prevent the telescopic means from being adjusted or moving in a direction parallel to the axis of the telescopic tubes. In addition to tabs, the securing means can be hooks, fingers, projections and the like. In an embodiment, the tabs are optional and used to further secure the adjusting means to the bracket base. In the position shown in FIGS. 5 and 6, the bracket clip tabs which are inserted into the slots in the bracket base prevent the safety guard from being pulled away from the bracket brace in the telescopic direction. Moreover, when the first locking cap 10 and second locking caps 12 are securely tightened, they further prevent the first and second telescopic tubes 6 and 8 from telescoping within the first and second outer telescopic tubes 2 and 4.

Figure 7:
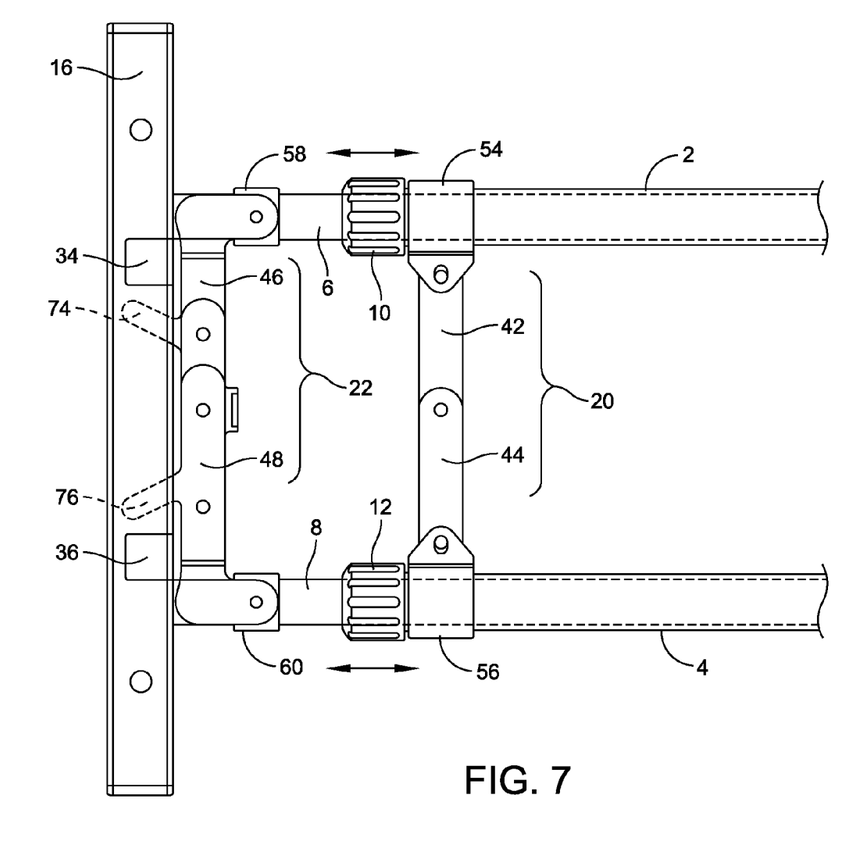
FIG. 7 is a side view of the bracket clip assembly inserted into the bracket base in a locked position, wherein the telescopic tubes are being adjusted in horizontal motion based on the dimensions of the window in which it is installed.

In FIGS. 6 and 7, the telescopic arrangement is in two different positions. The telescopic arrangement in FIG. 6 is extended to fit a wider window frame that that shown in FIG. 7. FIG. 7 shows that the safety guard can be adjusted by sliding the inner telescopic tube within the outer tube in a direction indicated by the arrows.

Figure 8:
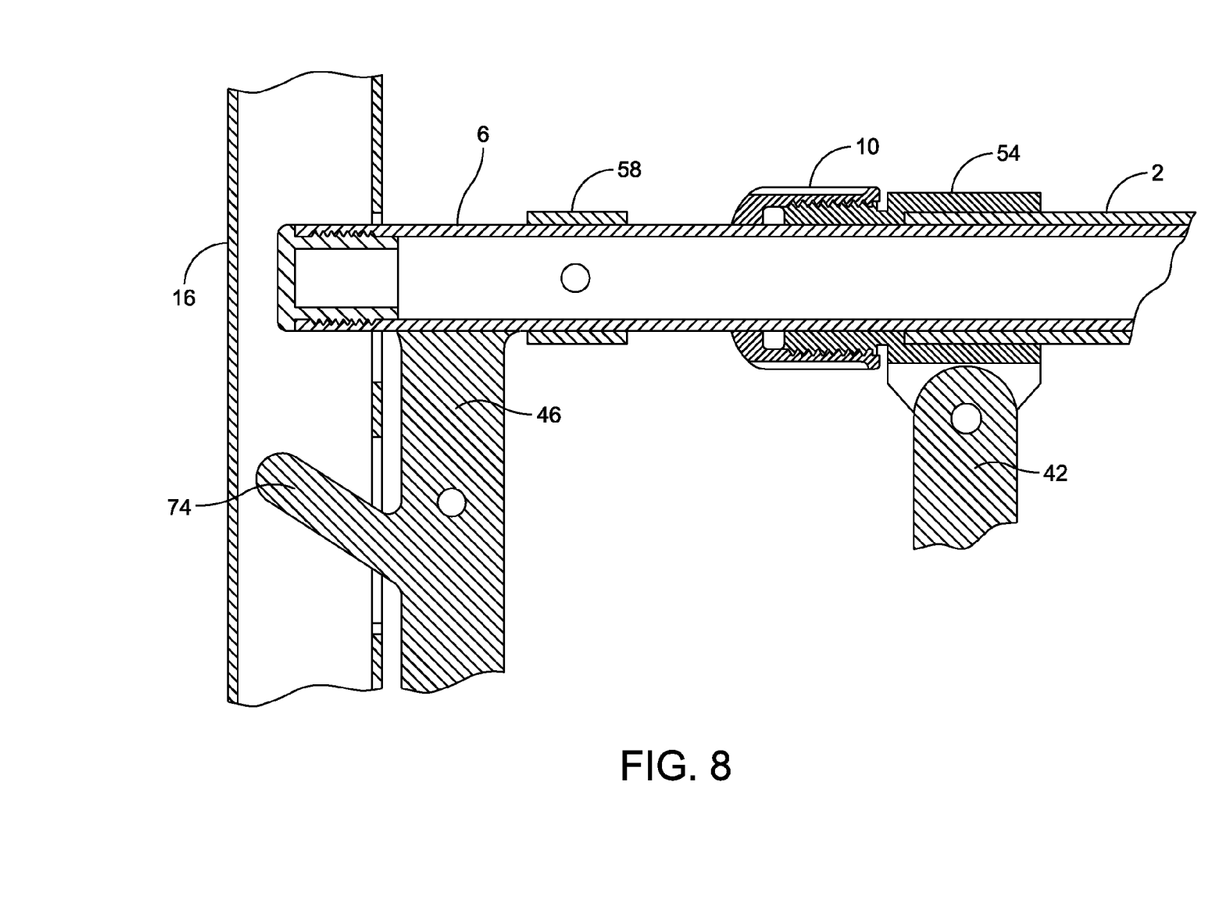
FIG. 8 is a cross-sectional side view showing detail of the interconnections between the mid and end bracket clips, and the locking cap with the inner and outer telescopic tubes.

FIG. 8 shows a cross-sectional view detailing the individual members that make up the second bracket clip 22, the mid-section bracket clip 20, the first telescopic inner tube 6, the first telescopic outer tube 2, the first locking cap 10 and the first opening in the second bracket 34.

Figure 9:
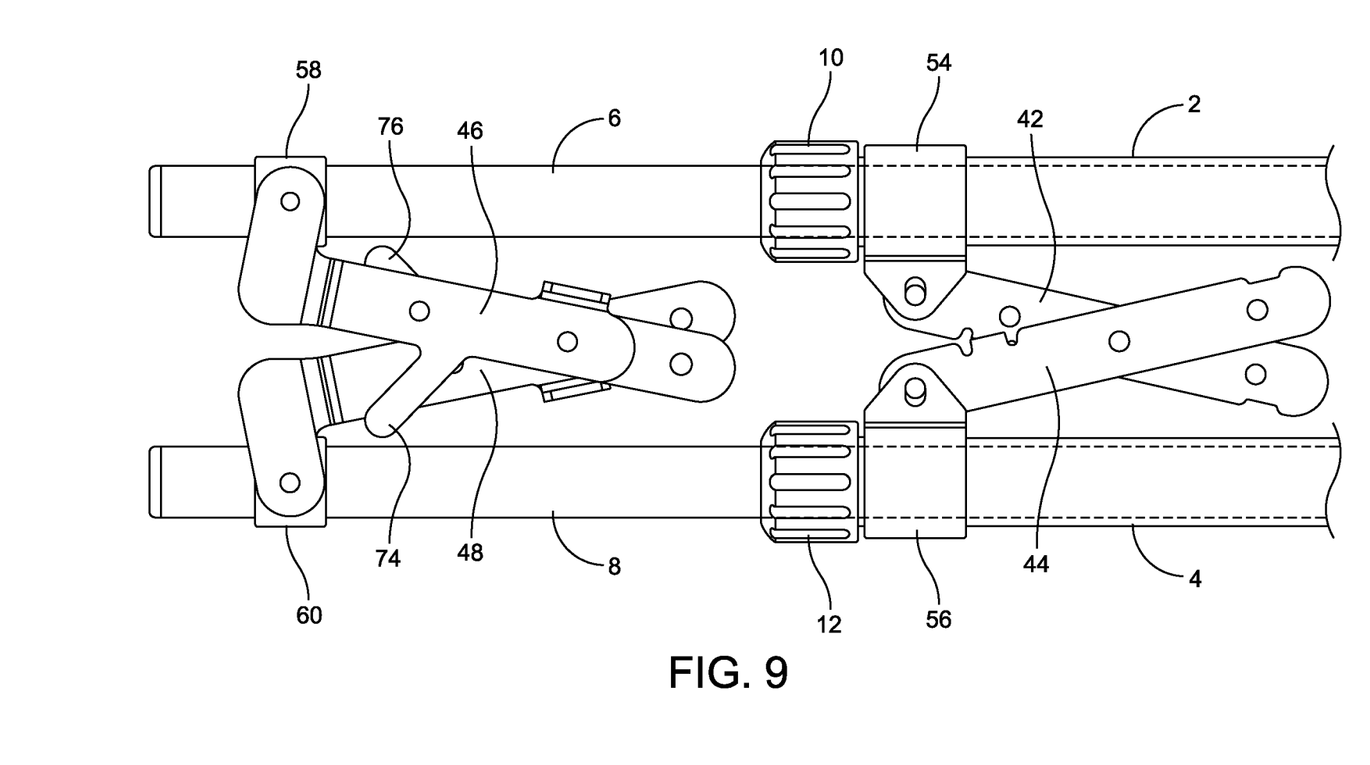
FIG. 9 is a side, detailed view of the end bracket clip, a mid-section bracket clip, telescopic outer and inner tubes, and locking caps, in a collapsed position.
Figure 10A:
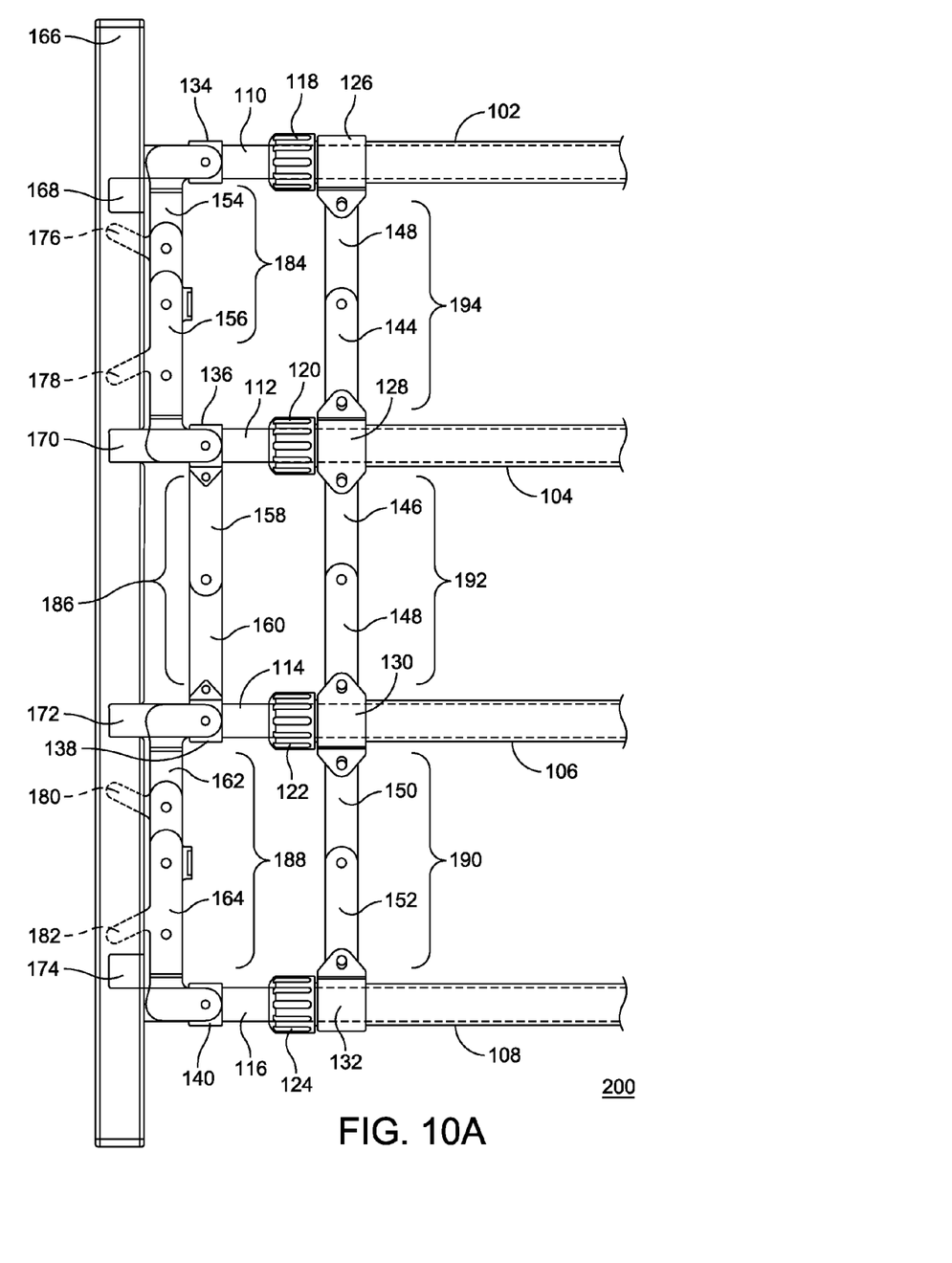
FIG. 10A is a side view of the bracket clip assembly inserted into the bracket base in a locked position showing four telescopic tube sets, wherein the telescopic tubes are being adjusted in horizontal motion.
Figure 10B:
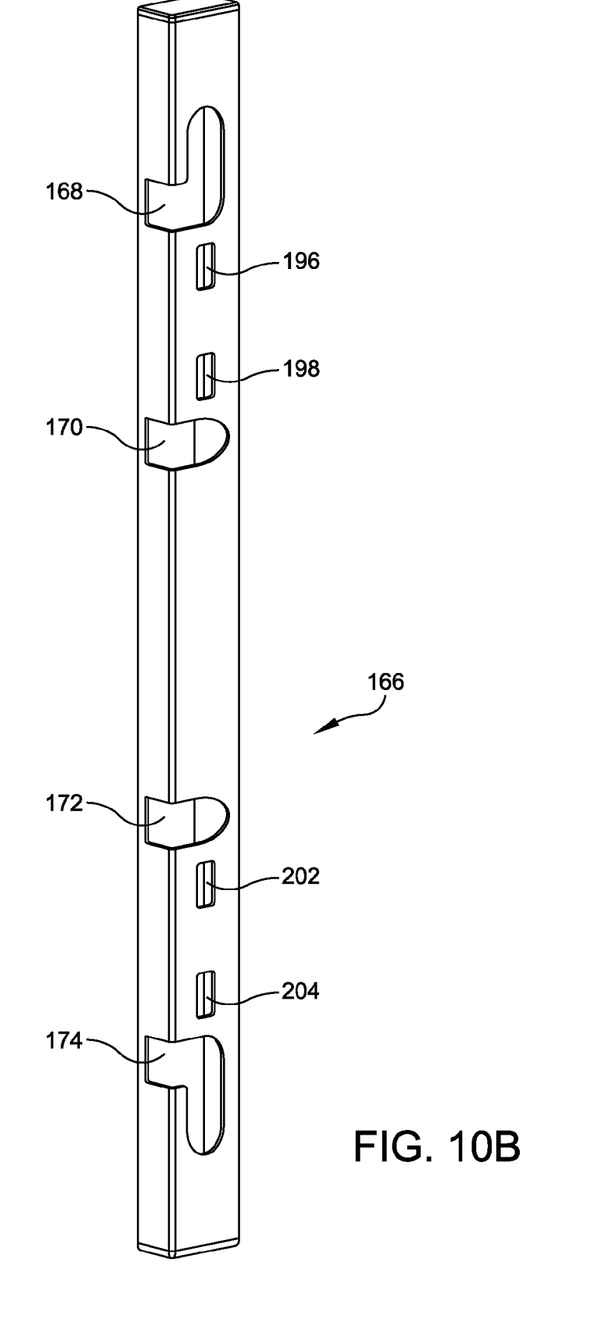
FIG. 10B is a perspective view of the bracket base showing the first and second openings.

FIG. 9 shows details of the safety guard's collapsibility making for easy storage within the house or on a retail shelf when it is not in use. In addition, the collapsed dimensions of the safety guard make for convenient shipping and storage. FIGS. 10A and 10B show safety guard system 200 which can be used so that users can open a horizontal window to a greater extent, or on a window that opens vertically. Generally, safety guidelines recommend that an opening of not more than about 4 inches be provided to prevent falls. Although a user can use a window stopper to prevent a window from opening more than 4 inches past the top of the window guard, one can also install additional telescopic means.

FIG. 10A shows safety guard system 200 which has four sets of telescopic tubes, inner tubes 110, 112, 114, and 116 which slide into outer tubes 102, 104, 106 and 108, respectively. The telescopic tubes can be adjusted, as described herein and secured with locking caps 118, 120, 122 or 124, respectively. The guard shown in FIG. 10A has six bracket clips, bracket clips 184, 186, 188, 190, 192, and 194. Bracket clip 184 includes arms 154 and 156, bracket clip 186 has arms 158 and 160, while bracket clip 188 includes arms 162 and 164. Similarly, mid-section bracket clip 190 includes arms 150 and 152, bracket clip 192 has arms 146 and 148, while bracket clip 194 includes arms 142 and 144. The bracket clips are attached to the telescopic tubes with annular attachments 126, 128, 130, 132, 134, 136, 138, and 140. The upper and lower bracket clips, bracket clips 184 and 188 have tabs 176, 178, 180 and 182. The middle bracket clip, bracket clip 186, does not have such clips. When bracket clips 184 and 188 are in the unlocked position, only telescopic tube 110 and 116 move along the notched openings 168 and 174, respectively of bracket base 166. See FIG. 10B. The rest of the telescopic tubes (e.g., tube 112 and 114) do not utilize a notched opening. Rather, the middle telescopic tubes utilize unnotched, pocket openings 170 and 172 and can simply slide out when the bracket clips are in the unlocked position. Similar to safety guard 100, safety guard 200 also has brackets with tabs. The upper and lower bracket clips, bracket clips 184 and 188, have tabs 176, 178 and 180 and 182, respectively. These tabs rotate into slots 196, 198, 202 and 204 respectively when the bracket clips are in the locked position. Note that middle bracket clip 186 does not need to have tabs. Tabs are optional for middle bracket clips in an embodiment in which more than two telescopic tube sets are used. Generally, the safety guard of the present invention can have more than two telescopic tube sets (e.g., 3, 4, 5, 6, etc.), in which case, the top and bottom telescopic tube utilize a notched pocket, whereas the middle telescopic tubes utilize a pocket opening that does not need to be notched.

The safety guard of the present invention can be made to fit any number of window frames. Generally, the safety guard can be manufactured to fit a window frame ranging from about 14 inches to about 120 inches. The safety guard of the present invention is also made to fit standard window frames having any one of the following sizes: about 14 to about 17 inches; about 17 to about 23 inches; about 23 to about 35 inches; about 35 to about 58 inches; about 58 to about 90 inches; or about 90 to about 120 inches. The safety guard of the present invention can be made to fit any number of various size window frames. As described herein, the number of adjustment means (e.g., telescopic tube sets) can vary and depends on the amount the user wants to open a window. In the case of either a vertical or horizontal opening window being open more than the standard safety amount (e.g., more than 4 inches), then a safety guard having more than two adjustment means can be used. In the case of a vertical opening window that is being opened more than 4 inches, then the entire window frame should be protected using the safety guard of the present invention. In the case of a horizontal opening window, the number of additional telescopic tubes depends on the amount the user wants to open the window. In an embodiment, if the user wants to open the widow more than 8 inches past the top of the window guard, then the safety guard of the present invention can utilized two additional telescopic tube sets. Accordingly, the safety guard has two or more adjustable means or telescopic tube sets (e.g., 2, 3, 4, 5, 6, 7, 8, 9, or 10).

The safety guard of the present invention can be made from a number of different types of materials including steel, aluminum, cast iron, plastic or any combination thereof. Such materials are commercially available from Haverhill Steel (Haverhill, Mass.), Cromwell Steel (Plainwell, Mass.), Atlantic Stainless Co., Inc. (North Attleboro, Mass.), and AAA Metals Co, Inc, (Hanson, Mass.). Such materials can be used to construct the entire safety guard of the present invention or portions of it. Other materials capable of providing sufficient strength and rigidity while also capable of being fabricated to include all of the necessary characteristics of the safety guard described herein can also be used. Any material now known or developed in the future can be used to make the safety guard so long.

An advantage of the safety guard of the present invention is that certain embodiments do not require clamps and locking pins. In an embodiment, the locking mechanism having a bracket clip that secures the telescopic arrangement in a base using a notched opening can secure the guard to the bracket base without a further need for additional clamps or locking pins. In this instance, quick removal, e.g., in case of a fire, can be accomplished because such pins/clamps do not need to be removed. Accordingly, use of additional clamps or locking pins is optional.

Rather than swinging inward to open a gate, the safety guard of the present invention collapses within the space it already occupies without requiring the user to move away from the window so the guard can be removed.

Another unique feature of the safety guard of the present invention is that it continues to work as designed even if it is dented or damaged. For example, if either of the inner or outer telescopic tubes are bent or dented, the telescopic motion may not be possible anymore. However, even if the telescopic means for adjusting the width is no longer possible, the safety guard can still be removed from the frame of an opening by collapsing the first, mid-section and second bracket clips. In addition, the bent or damaged safety guard can be reinstalled into the same window for further use because even if the telescopic motion is not possible, the width of the safety guard will already be adjusted properly for the window it was previously installed in. The safety guard of the present invention has been extensively tested and can continue to be installed and removed even after repeated damage.

The safety guard of the present invention allows the adjustable means to be secured to the base (e.g., attachment means) using this unique locking mechanism. The unique locking mechanism, also referred herein as the securing means, has a dual function. The securing means prevents the adjustable means from moving along the axis shown in FIG. 7 when the means are in a locked position, but allows release/engagement of the adjustable means from the base when in an unlocked position via a different axis. The axis is defined by two or more points along the telescopic tubes or adjustable means, and is the axis along which the adjustable means adjusts to fit the frame. The securing means also allows one to disengage or engage the adjustable means from the base when the brackets are partially collapsed through the notched opening via face A. See FIG. 4. When the securing means is in this unlocked position (e.g., see FIG. 3), the release of the adjustable means through the notched opening occurs in a direction that transects or is perpendicular to the axis of the adjustable means. The securing means includes the combination of elements described herein that allow for this dual function. Examples of such elements include the notched openings in the bases, the bracket clips, the tabs, the slots, the telescopic arrangement, and a combination thereof.

The present invention also pertains to methods and systems utilizing the safety guard of the present invention. The methods involve installing the safety guard onto a frame of an opening such as a window, door or stairwell. Installing the safety guard involves placing the locking mechanism in an unlocked position, sliding the adjustable means into the corresponding openings of bracket base, and engaging the locking mechanism so that it is in a locked position. When the locking mechanism is in the locked position, the telescopic tubes slide into the notched opening, as shown in FIGS. 5 and 6, and the tabs rotate into the slots of the bases.

Once installed, the methods further include preventing an individual (e.g., child) or pet from passing or falling through the opening. The methods further include releasing the safety guard from the base by placing the locking mechanism into an unlocked position and removing the adjustment means from the base. When in an unlocked position, the adjustable means slide out of the notched opening, and the tabs rotate out of the slots in the base thereby allowing the adjustable means to be removed from the base. In an embodiment, the safety guard can be released even in the event that the adjustable means are damaged, dented, or bent.

Systems of the present invention include the elements described herein. The elements can come fully assembled or partially assembled. Additionally, the systems of the present invention can include one or more tools for installation, and/or one or more window stoppers to be installed so that a window cannot be opened past a certain height. Generally, safety recommendations indicate that an opening of not more than about 4 inches be present so that a child or pet cannot fit through the opening. Accordingly, the window stopper can be included in the systems of the present invention and instructions provided to position the stopper so that the window does not open more than a specified amount (e.g., 4 inches) above the adjusting means of the safety guard.

EXEMPLIFICATION

A window safety guard, such as the one shown in FIGS. 1-10, was made. Additional embodiments can be manufactured to have window widths or heights in the following ranges: 14-17 inches; 17-23 inches; 23-35 inches, 35-58 inches; 58-90 inches; or 90-120 inches. The safety guard can be used with 3, 4 or 5 bars. In three arrangements (3, 4 or 5 bars), the maximum gap between each bars is, for example, about 3.875 inches, ensuring that the 4 inch maximum gap requirement by certain safety guidelines is met. In addition, for the safety guards that have been made, the maximum gap between a bar and the top or bottom of the safety guard is about 1.875 inches so that even when two or more safety guards are used to cover a large window, the maximum gap of no more than 4 inches can still be maintained, assuming the safety guards are installed immediately next to each other.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for securing a safety guard or gate to a frame of an opening, wherein the method comprises:

a. adjusting a telescopic means of the safety guard or gate to fit the width of the frame, wherein the safety guard or gate comprises:
   i. the telescopic means for adjusting the guard to fit the width of the frame;
   ii. a first bracket comprising a first bracket base and a first bracket clip, wherein the first bracket base has a first means for securing the first bracket base to the frame, wherein the first bracket base is adapted to receive the first end of the telescopic means, and wherein the first bracket clip locks the first end of the telescopic means into place; and
   iii. a second bracket comprising a second bracket base and a second bracket clip, wherein the second bracket base has a second means for securing the second bracket base to the frame, wherein each of the first and second bracket bases has one or more openings that allow for movement of the telescopic means along two axes, wherein the movement of the telescopic means occurs within the openings and the two axes are substantially perpendicular to each other and to an axis along a length of the telescopic means, wherein the first and second bracket clips allow rearranging the telescopic means into a collapsed position without the first and second bracket clips being disconnected from the telescopic means and without the length of the telescopic means needing to be adjusted, wherein the second bracket base is adapted to receive the second end of the telescopic means, wherein each of the first and second bracket clips can engage more than one telescopic means, and wherein the second bracket clip locks the second end of the telescopic means into place;
b. locking the telescopic means;
c. engaging the first and second bracket clips to the first and second bracket bases to secure the telescopic means to the first and second bracket bases.

2. The method of claim 1, further comprising securing the first bracket base and second bracket base to the frame, and engaging the first bracket clip and the second bracket clip.

3. A method of removing a safety guard or gate from a frame of an opening, wherein the method comprises the steps of:
a. disengaging a first and a second bracket of the safety guard or gate, wherein the safety guard or gate comprises:
   i. a telescopic means for adjusting the guard to fit the width of the frame;
   ii. the first bracket comprising a first bracket base and a first bracket clip, wherein the first bracket base has a first means for securing the first bracket base to the frame, wherein the first bracket base is adapted to receive the first end of the telescopic means, and wherein the first bracket clip locks the first end of the telescopic means into place; and
   iii. the second bracket comprising a second bracket base and a second bracket clip, wherein the second bracket base has a second means for securing the second bracket base to the frame, wherein each of the first and second bracket bases has one or more openings that allow for movement of the telescopic means along two axes, wherein the movement of the telescopic means occurs within the openings and the two axes are substantially perpendicular to each other and to an axis along a length of the telescopic means, wherein the first and second bracket clips allow rearranging the telescopic means into a collapsed position without the first and second bracket clips being disconnected from the telescopic means and without the length of the telescopic means needing to be adjusted, wherein the second bracket base is adapted to receive the second end of the telescopic means, wherein each of the first and second bracket clips can engage more than one telescopic means, and wherein the second bracket clip locks the second end of the telescopic means into place; and
b. sliding the ends of the telescopic means out from the bracket bases.

4. The method of claim 3, further comprising the steps of:
a. disengaging the first bracket clip and the second bracket clip;
b. removing the telescopic means from the base; and
c. collapsing the safety guard for storage.

5. The method of claim 3, further comprising the steps of:
a. unlocking the telescopic means; and
b. adjusting the telescopic means to a minimum width.

6. A method of removing a safety guard or gate from a frame of an opening after the guard or gate has been damaged, wherein the method comprises the steps of:
a. disengaging a first and a second bracket of the safety guard or gate, wherein the safety guard or gate comprises:
b. disengaging first and second brackets of the safety guard or gate, wherein the safety guard or gate comprises:
   i. a telescopic means for adjusting the guard to fit the width of the frame;
   ii. the first bracket comprising a first bracket base and a first bracket clip, wherein the first bracket base has a first means for securing the first bracket base to the frame, wherein the first bracket base is adapted to receive the first end of the telescopic means, and wherein the first bracket clip locks the first end of the telescopic means into place; and
   iii. the second bracket comprising a second bracket base and a second bracket clip, wherein the second bracket base has a second means for securing the second bracket base to the frame, wherein each of the first and second bracket bases has one or more openings that allow for movement of the telescopic means along two axes, wherein the movement of the telescopic means occurs within the openings and the two axes are substantially perpendicular to each other and to an axis along a length of the telescopic means, wherein the first and second bracket clips allow rearranging the telescopic means into a collapsed position without the first and second bracket clips being disconnected from the telescopic means and without the length of the telescopic means needing to be adjusted, wherein the second bracket base is adapted to receive the second end of the telescopic means, wherein each of the first and second bracket clips can engage more than one telescopic means, and wherein the second bracket clip locks the second end of the telescopic means into place; and
c. removing the ends of the pair of telescopic means from the bracket bases;

wherein the means for locking the telescopic means does not need to be engaged.

* * * * *